US012756437B2

(12) United States Patent
Raghavan et al.

(10) Patent No.: US 12,756,437 B2
(45) Date of Patent: Oct. 6, 2026

(54) DYNAMIC ANTENNA MODULE COMBINING

(71) Applicant: Qualcomm Incorporated, San Diego, CA (US)

(72) Inventors: Vasanthan Raghavan, West Windsor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 18/752,582

(22) Filed: Jun. 24, 2024

(65) Prior Publication Data

US 2025/0392357 A1 Dec. 25, 2025

(51) Int. Cl.
*H04L 5/12* (2006.01)
*H04B 7/06* (2006.01)
*H04B 7/08* (2006.01)
*H04W 72/044* (2023.01)

(52) U.S. Cl.
CPC ......... *H04B 7/0608* (2013.01); *H04B 7/0802* (2013.01); *H04W 72/046* (2013.01)

(58) Field of Classification Search
CPC .. H04B 7/0608; H04B 7/0802; H04W 72/046
USPC ................ 375/262, 260, 259, 219, 295, 316
See application file for complete search history.

(56) References Cited

U.S. PATENT DOCUMENTS

2021/0159990 A1* 5/2021 Meylan ................ H04B 17/309
2023/0139016 A1* 5/2023 Nadakuduti ........ H04W 52/283 370/318
2023/0261718 A1* 8/2023 Zhuang .............. H04B 7/06956 455/422.1
2024/0178576 A1* 5/2024 Nihei ................... H01Q 21/065

OTHER PUBLICATIONS

ETSI TS 138 214: 3GPP, 5G, NR, Physical Layer Procedures for Data (3GPP TS 38.214 version 17.9.0 Release 17), ETSI TS 138 214, V17.9.0, Apr. 2024, 237 Pages.

* cited by examiner

*Primary Examiner* — Zewdu A Kassa
(74) *Attorney, Agent, or Firm* — Dinsmore & Shohl LLP

(57) ABSTRACT

Certain aspects of the present disclosure provide techniques for dynamic antenna module combining. An example method for wireless communications by an apparatus includes sending a request to enable antenna module combining for communications; and communicating with a network entity via a first type of antenna module and a second type of antenna module with the antenna module combining enabled.

19 Claims, 12 Drawing Sheets

DYNAMIC ANTENNA MODULE COMBINING

INTRODUCTION

Field of the Disclosure

Aspects of the present disclosure relate to wireless communications, and more particularly, to techniques for dynamic antenna module combining, for example, with different types of antenna modules based on regulatory specifications, channel conditions, quality-of-service specifications, etc.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes sending a request to enable antenna module combining for communications; and communicating with a network entity via a first type of antenna module and a second type of antenna module with the antenna module combining enabled.

Another aspect provides a method for wireless communications by an apparatus. The method includes obtaining a request to enable antenna module combining for communications; and communicating with a user equipment with the antenna module combining enabled.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
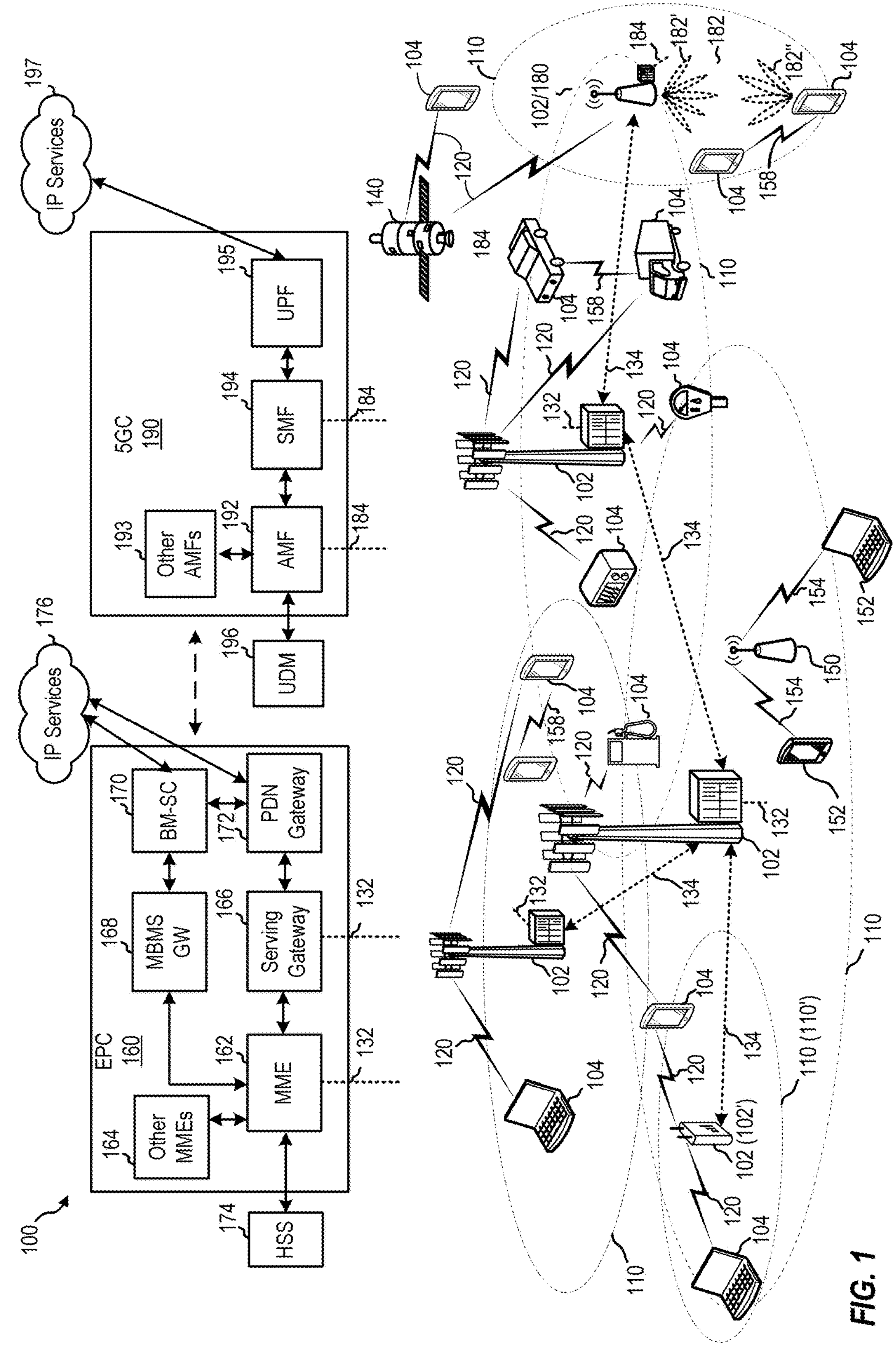
FIG. 1 depicts an example wireless communications network.

Aspects of the present disclosure provide apparatuses, methods, processing systems, and computer-readable mediums for dynamic antenna module combining, for example, with an antenna on display.

Certain wireless communications devices (e.g., smart phones and/or wearable devices) may employ an antenna (or a set of antenna elements as a part of an antenna module) integrated with a display, such as an organic light-emitting diode (OLED) display and/or a liquid-crystal display (LCD). Such an antenna may be referred to as an antenna on display (AoD), which may be optically transparent or invisible to a human eye. As used herein, an antenna integrated with a display may refer to one or more antennas (such as a set of antenna elements of an antenna module) integrated with, in, and/or on (e.g., arranged above or below) the display. The AoD may be arranged in various positions across a display of a device, which may provide flexibility in positioning the antenna for spatial diversity and/or sensing applications (such as sensing and/or communications effectively from or to the display). The AoD may be used for wireless communications and/or sensing applications, such as hand gesture or body position recognition in front of the display. In certain cases, as a standalone system, an AoD may exhibit reduced antenna gains (for example, due to signal attenuation over the display). Thus, a device may use the AoD in combination with another antenna module for wireless communications. For example, the AoD may be used to provide supplemental beamforming gains for transmissions or receptions via the other antenna module(s) to achieve additional spatial selectivity for wireless communications.

Certain governmental agencies and/or standards bodies (e.g., the Federal Communications Commission (FCC) for the United States; the Innovation, Science and Economic Development Canada (ISED) for Canada; or the International Commission on Non-Ionizing Radiation Protection (ICNIRP) guidelines followed by the European Union (EU)), define specifications for human exposure to radio frequency (RF) electromagnetic fields emitted from electronic devices (e.g., cellular phones, smart phones, wearable devices, etc.). An RF exposure specification may define the maximum permissible exposure (MPE) limit for field strength and power density for transmitters operating at frequencies of 300 kHz to 100 GHz, as further described herein. As the RF exposure level is proportional to the transmit power used for transmission of RF signals, the device may control the transmit power used for transmissions in order to ensure the RF exposure level complies with the RF exposure specifications. In certain cases, RF exposure compliance for a wireless device may differ depending on an RF exposure scenario exhibited by a wireless device. For example, the wireless device may be near the user's head, eyes, body (e.g., torso), and/or extremity (e.g., hand), where the RF exposure level may be higher. In some cases, the wireless device may be positioned away from the user's body (e.g., when charging or being used as a hotspot), where the RF exposure level may be lower. A different RF exposure limit (e.g., a time-averaged transmit power limit) for RF exposure compliance may be used depending on the RF exposure scenario exhibited by the wireless device.

Technical problems for wireless communications via an AoD may include, for example, ensuring compliance with RF exposure specifications while communicating via an AoD. As a device with an AoD is often used by or near a human (such as the head, hand, or torso), the device may be emitting RF signals in proximity to human tissue, such as the human tissue of the user of the device and/or a bystander. For example, when a device (e.g., a phone) with an AoD is being held near the user's head, the AoD can expose the user's hand and/or head to RF emissions. In certain cases, the device may be positioned in a pocket or a bag (e.g., a backpack, purse, or fanny pack) of the user, which may correspond to a body-worn exposure scenario. In some cases, the device may be positioned in relation to the user, such that the device exposes the user to far field RF emissions, for example, when the device is positioned away from the user's body on a desk or table in a hotspot mode or while charging. To ensure the user is not overexposed to RF emissions from the device, the device may control the transmit power used to emit the RF signals in accordance with an RF exposure limit or specification, as further described herein. In certain cases, the RF exposure limit may depend on a corresponding exposure scenario (e.g., head exposure scenario, extremity (e.g., hand) exposure scenario, body (body-worn) exposure scenario, hotspot exposure scenario, etc.). Extremities may include, for example, hands, wrists, feet, ankles, and/or pinnae. Accordingly, the position of the device relative to human tissue may affect the transmission performance of the device in order to ensure the RF emissions comply with the RF exposure specification.

Aspects described herein may overcome the aforementioned technical problem(s), for example, by providing schemes for communicating via an AoD in compliance with certain RF exposure specifications. In certain aspects, a user equipment (UE) may notify a network entity (e.g., a base station) of certain information or parameter(s) related to communications via an AoD, such as via antenna module combining, which may use an AoD and one or more other antenna module(s) for wireless communications. As an example, the UE may notify the network entity of when to enable or disable antenna module combining. In certain aspects, the UE may notify the network entity that a transmit power backoff is enabled for the antenna module combining. The transmit power backoff may be applied to set a maximum allowed transmit power in compliance with an RF exposure specification. The UE may notify the network entity to enable antenna module combining when a transmit power backoff is less than or equal to a threshold backoff level. The UE may notify the network entity to disable antenna module combining when the transmit power backoff is greater than or equal to a threshold backoff level. In certain aspects, the UE may notify the network entity of a plurality of transmission configuration indicator (TCI) states for the antenna module combining. A TCI state may correspond to a transmit and/or receive beam used at a UE for communications for the antenna module combining. Accordingly, the information and/or parameters exchanged for communications via an AoD may ensure compliance with the RF exposure specifications.

Certain techniques for dynamic antenna module combining described herein may provide various beneficial technical effects and/or advantages. The techniques for dynamic antenna module combining may enable improved wireless communications performance, such as improved antenna gains for millimeter wave (mmWave) communications (e.g., improvements of about 3 to 4 decibels). The improved antenna gains may be attributable to the AoD enabling supplemental phased array beamforming for mmWave communications. In certain cases, the improved antenna gains may be attributable to the AoD serving as a passive radiator, such as a reflector and/or director, to modify the radiation pattern emitted from an antenna module. In certain cases, the dynamic antenna module combining may enable communications via an AoD in compliance with certain RF exposure specification(s).

The term "beam" may be used in the present disclosure in various contexts. Beam may be used to mean a set of gains and/or phases (e.g., precoding weights or co-phasing weights) applied to antenna elements in (or associated with)

a wireless communication device for transmission or reception. The term "beam" may also refer to an antenna or radiation pattern of a signal transmitted while applying the gains and/or phases to the antenna elements. Other references to beam may include one or more properties or parameters associated with the antenna (or radiation) pattern, such as an angle of arrival, an angle of departure, a gain, a phase, a directivity, a beamwidth, a beam direction (with respect to a plane of reference) in terms of azimuth and/or elevation, a peak-to-side-lobe ratio, and/or an antenna (or precoding) port associated with the antenna (radiation) pattern. The term "beam" may also refer to an associated number and/or configuration of antenna elements (e.g., a uniform linear array, a uniform rectangular array, or other uniformly spaced antenna array).

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
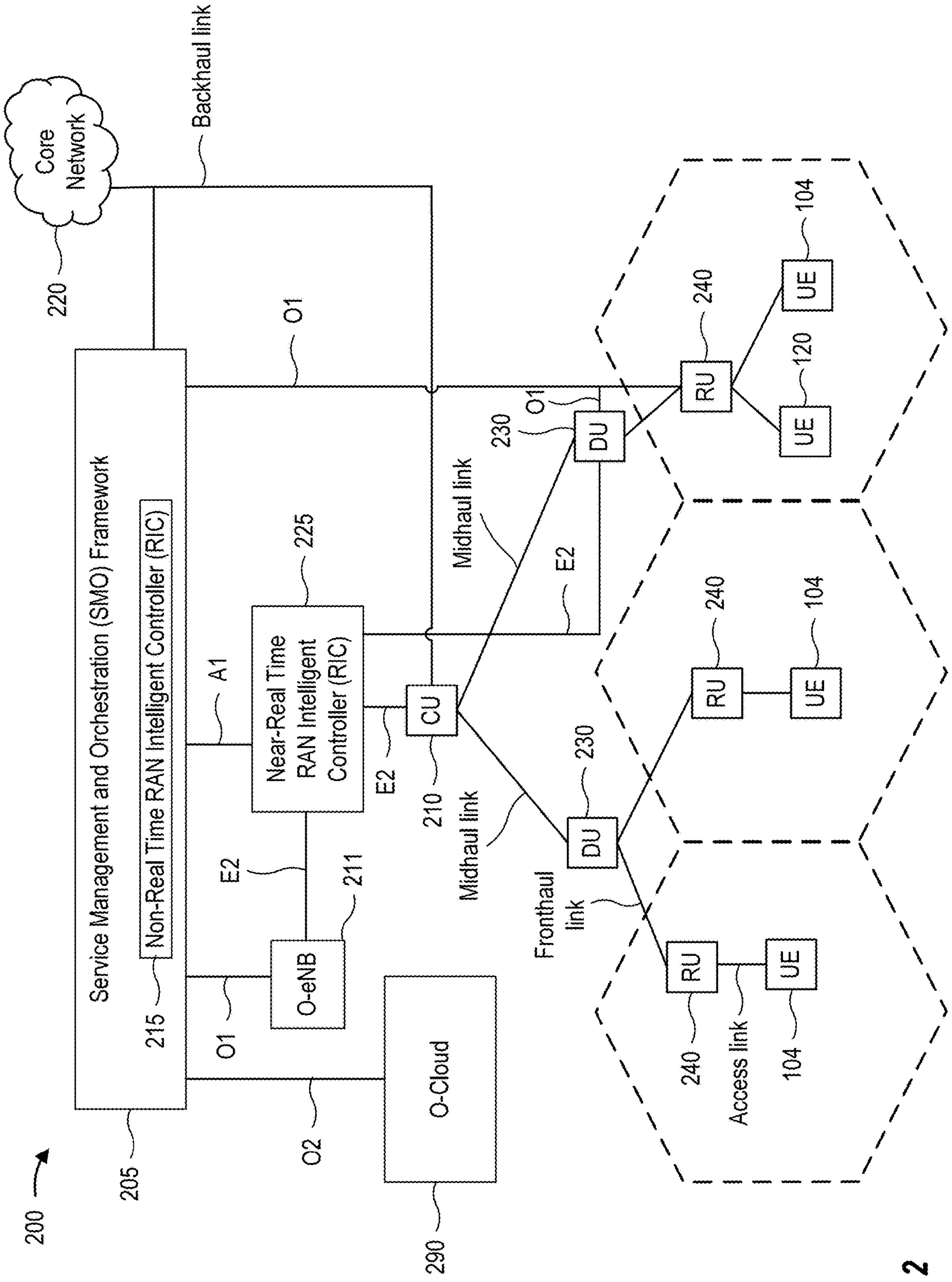
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
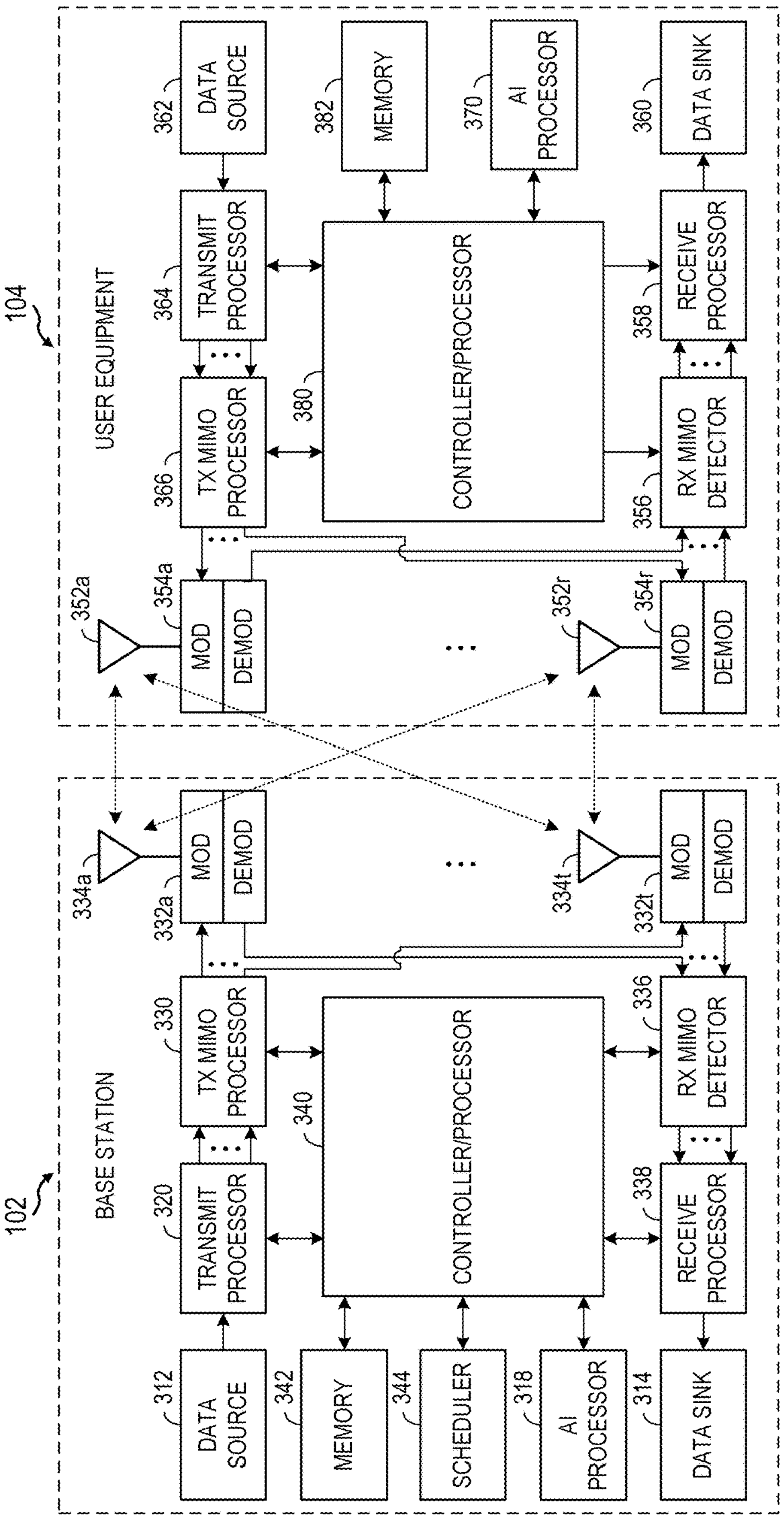
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figure 4B:
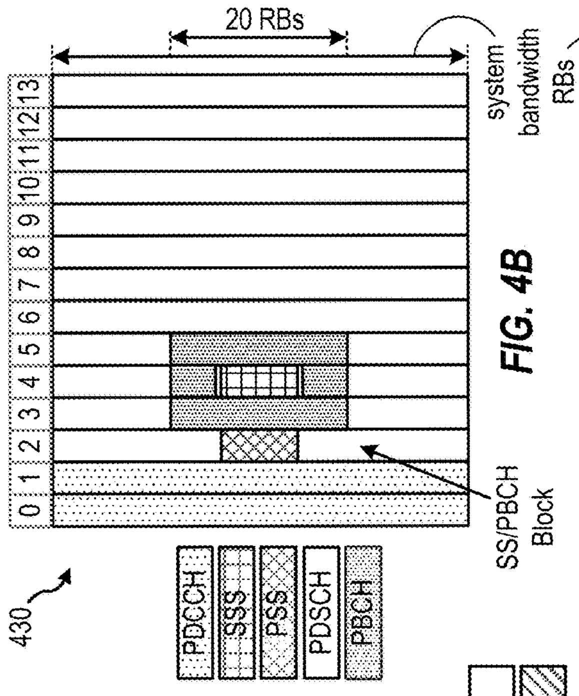
FIGS. 4A, 4B, 4C, and 4D depict various example aspects of data structures for a wireless communications network.
Figure 4A:
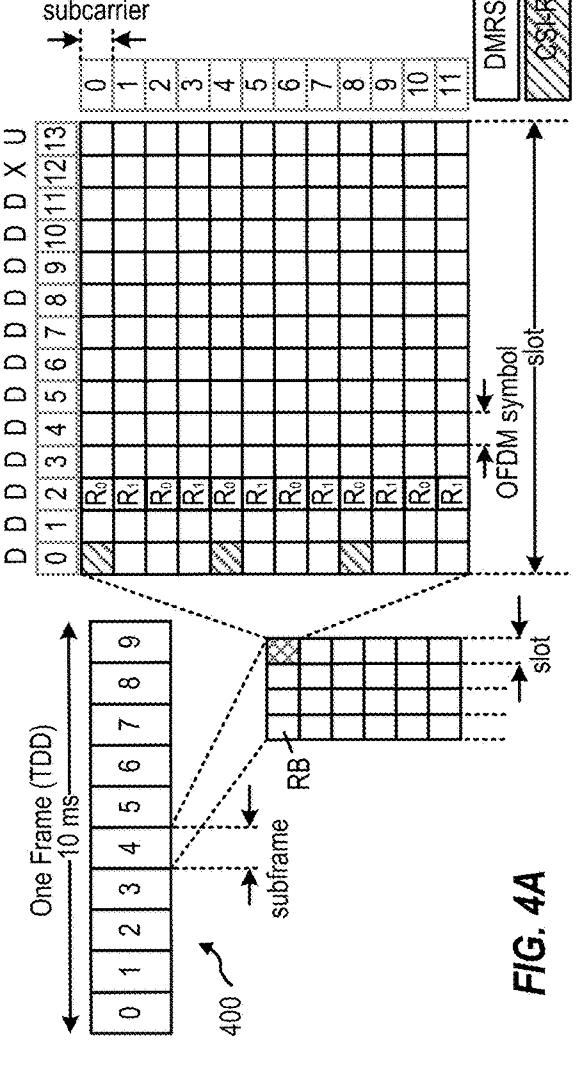
Figure 4D:
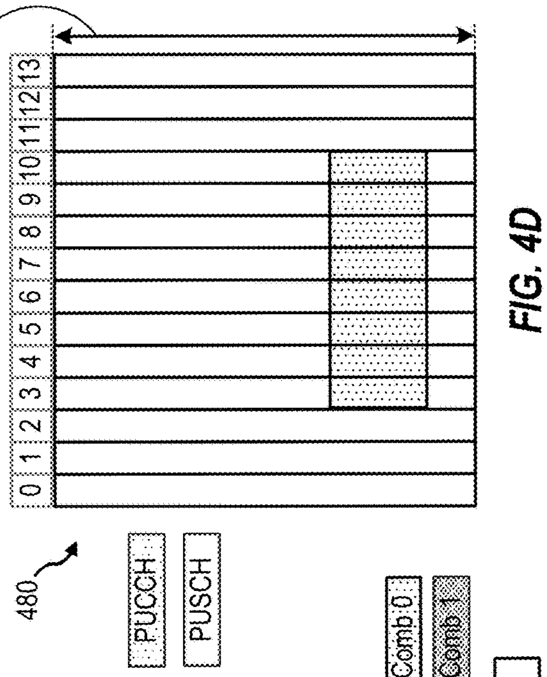
Figure 4C:
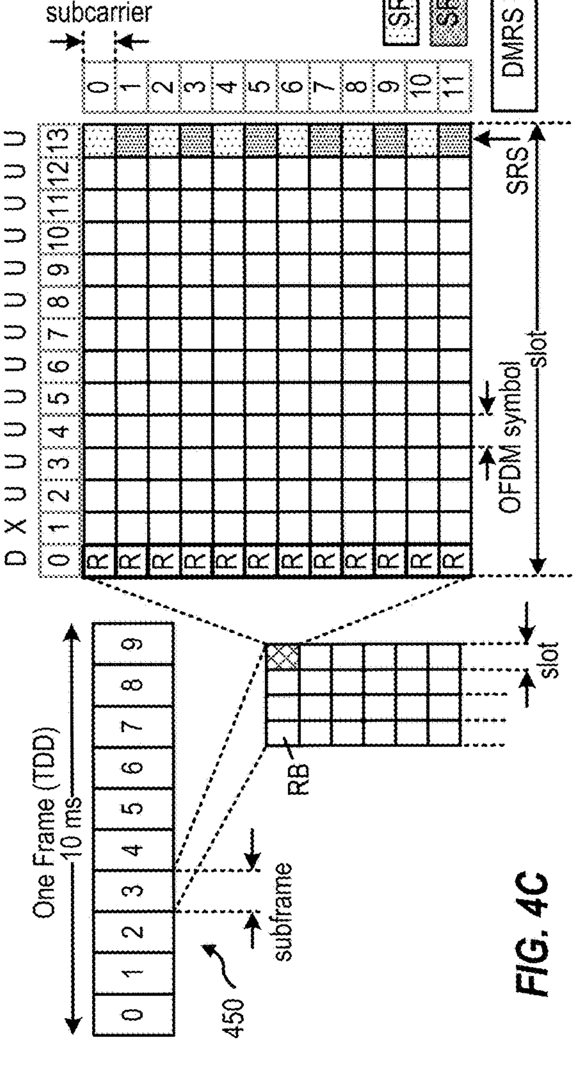

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology μ, there are 24 slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times15$ kHz, where u is the numerology 0 to 6. As an example, the numerology μ=0 corresponds to a subcarrier spacing of 15 kHz, and the numerology μ=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology μ=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example RF Exposure Compliance

In certain cases, a wireless communications device (e.g., the UE 104) may control the transmit power used to emit RF signals in compliance with an RF exposure limit or specification. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter ($mW/cm^2$). In some cases, the RF exposure may be expressed in terms of a specific energy absorption (SA) limit or an absorbed energy density (Uab) limit, for example, for a total RF energy limit allowed in a specific time period. In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change. Certain RF exposure limits may be specified based on a maximum RF exposure metric (e.g., SAR or PD) averaged over a specified time window (e.g., 100 or 360 seconds for sub-6 GHz frequency bands or 2 seconds for 60 GHz bands).

SAR may be used to assess RF exposure for transmission frequencies less than or equal to 6 GHz, which may correspond to wireless communication technologies such as 2G/3G (e.g., CDMA), 4G (e.g., E-UTRA), 5G (e.g., NR in sub-6 GHz bands), IEEE 802.11 (e.g., 802.11a/b/g/n/ac/ax), or the like. PD may be used to assess RF exposure for transmission frequencies higher than 6 GHz, which may correspond to wireless communication technologies such as IEEE 802.11ad, IEEE 802.11ay, 5G NR in mmWave bands, etc. Thus, different metrics may be used to assess RF exposure for different wireless communication technologies.

A wireless device (e.g., the UE 104) may be capable of transmitting signals using multiple wireless communication technologies and/or frequency bands, and in some cases, capable of simultaneous transmission of such signals. For example, the wireless device may transmit signals using a first wireless communication technology operating at or below 6 GHZ (e.g., 3G, 4G, 5G, 802.11a/b/g/n/ac/ax, etc.) and a second wireless communication technology operating above 6 GHz (e.g., mm Wave 5G in 24 to 60 GHz bands, IEEE 802.11ad or 802.11ay). In certain aspects, the wireless device may transmit signals using the first wireless communication technology (e.g., 3G, 4G, 5G in sub-6 GHz bands, IEEE 802.11ac, etc.) in which RF exposure may be measured in terms of SAR, and the second wireless communication technology (e.g., 5G in 24 to 71 GHz bands, IEEE 802.11ad, 802.11ay, etc.) in which RF exposure may be measured in terms of PD.

In certain cases, compliance with an RF exposure limit may be performed as a time-averaged RF exposure evaluation within a specified running (moving) time window associated with the RF exposure limit. The RF exposure limit may specify a time-averaged RF exposure metric (e.g., SAR and/or PD) over the running time window. As an example, the FCC specifies that certain SAR limits (general public exposure) are 0.08 W/kg, as averaged over the whole body, and a peak spatial-average SAR of 1.6 W/kg, averaged over any 1 gram of tissue (defined as a tissue volume in the shape of a cube) for sub-6 GHz bands, whereas certain PD limits are 1 $mW/cm^2$, as averaged over the whole body, and a peak spatial-average PD of 4 $mW/cm^2$, averaged over any 1 $cm^2$. The FCC also specifies the corresponding averaging time may be six minutes (360 seconds) for sub-6 GHz bands, whereas the averaging time may be 2 seconds for mm Wave bands (e.g., 60 GHz frequency bands) under certain proposed regulations, for example.

The RF exposure limit and/or corresponding averaging time window may vary based on the frequency band used for wireless communications and/or the RF exposure scenario encountered (e.g., head exposure, extremity exposure, body-worn or torso exposure, hotspot exposure, or the like). In certain aspects, the RF exposure limit(s) and/or corresponding averaging time window(s), if applicable, may be specific to a particular geographic region or country, such as the United States, Canada, China, or European Union. In some cases, the RF exposure limit(s) may specify the maximum allowed RF exposure that can be encountered without time averaging. In such cases, the maximum allowed RF exposure may correspond to a maximum allowed output or transmit power that can be used by the wireless device.

Figure 5:
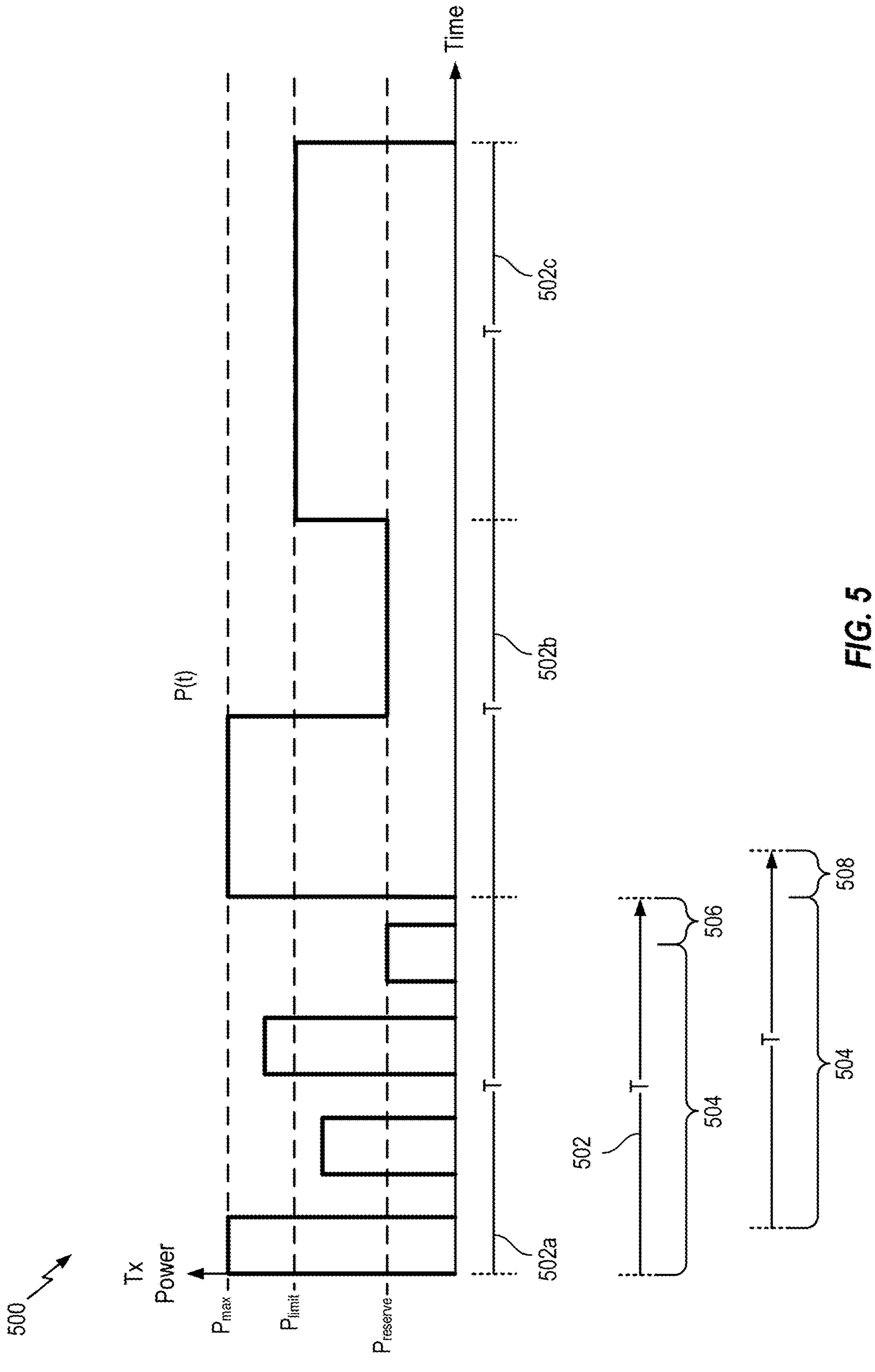
FIG. 5 depicts an example graph of a transmit power associated with a radio frequency exposure specification.

FIG. 5 depicts an example graph 500 of a transmit power over time (P (t)) that varies over a running (e.g., rolling or moving) time window (T) associated with an RF exposure limit. The wireless device (e.g., the UE 104) may evaluate RF exposure compliance over the running time window 502 (T) based on past RF exposure (e.g., a transmit power report) in a past time interval 504 of the time window 502 and a future time interval 506. The wireless device may determine the maximum allowed transmit power for a future time interval 506 that satisfies the time-averaged RF exposure limit based on the past RF exposure used in the past time interval 504. The wireless device may perform such a time-averaging evaluation as the time window 502 moves over time, for example, in the next future time interval 508, where the past time interval 504 now includes the previous time interval 506.

The maximum time-averaged transmit power limit ($P_{limit}$) represents the maximum transmit power the wireless device can transmit continuously for the duration of the running time window 502 (T) in compliance with the RF exposure limit. For example, the wireless device is transmitting continuously at $P_{limit}$ in the third time window 502*c* such that the time-averaged transmit power over the time window (e.g., the third time window 502*c*) is equal to $P_{limit}$ in compliance with the time-averaged RF exposure limit.

In certain cases, an instantaneous transmit power may exceed $P_{limit}$ in certain transmission occasions, for example, as shown in the first time window 502*a* and the second time window 502*b*. In some cases, the wireless device may transmit at $P_{max}$, which may be the maximum instantaneous transmit power supported by the wireless device, the maximum instantaneous transmit power that the wireless device is capable of outputting, or the maximum instantaneous transmit power allowed by a standard or regulatory body (e.g., the maximum output power, PCMAX, to minimize interference). In some cases, the wireless device may transmit at a transmit power less than or equal to $P_{limit}$ in certain transmission occasions, for example, as shown in the first time window 502*a*.

In certain cases, a reserve power may be used to enable a continuous transmission within a time window (T) when transmitting above $P_{limit}$ in the time window or to enable a certain level of quality for certain transmissions. As shown in the second time window 502*b*, the transmit power may be backed off from $P_{max}$ to a reserve power ($P_{reserve}$) so that the wireless device can maintain a continuous transmission during the time window (e.g., maintain a radio connection with a receiving entity) in compliance with the time-averaged RF exposure limit. In the third time window 502*c*, the wireless device may increase the transmit power to $P_{limit}$ in compliance with the time-averaged RF exposure limit. In some cases, $P_{reserve}$ may allow for a certain level of transmission quality for certain transmissions (e.g., control signaling, high priority communications, low latency communications, highly reliable communications, etc.). $P_{reserve}$ may be used to reserve transmit power for at least a portion of the time window 502 for certain transmissions (e.g., control signaling).

In the second time window 502*b*, the area between $P_{max}$ and $P_{reserve}$ for the time duration of transmitting at $P_{max}$ may be equal to the area between $P_{limit}$ and $P_{reserve}$ for the time window T, such that the total area of transmit power (P(t)) in the second time window 502*b* is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit.

In some aspects, the wireless device may transmit at a power that is higher than $P_{limit}$, but less than $P_{max}$ in the time-average mode illustrated in the second time window 502*b*. While a single transmit burst is illustrated in the second time window 502*b*, it will be understood that the wireless device may instead utilize a plurality of transmit bursts within the time window (T), where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above $P_{limit}$.

In certain aspects, the wireless device may transmit at a power less than or equal to a fixed power limit (e.g., $P_{limit}$) without considering past exposure and/or past transmit powers in terms of a time-averaged RF exposure. For example, the wireless device may transmit at a power less than or equal to $P_{limit}$ using a look-up table (comprising one or more values of $P_{limit}$ depending on an RF exposure scenario). The look-up table may provide one or more values of $P_{limit}$ depending on the transmit frequency, transmit antenna, radio configuration (single-radio or multi-radio) and/or RF exposure scenario (e.g., a device state index corresponding to head exposure, body-worn or torso exposure, extremity or hand exposure, and/or hotspot exposure) encountered by the wireless device. Examples of RF exposure scenarios include cases where the wireless device is emitting RF signals proximate to human tissue, such as a user's head, extremity (e.g., hand), or body (e.g., torso), or where the wireless device is positioned away from human tissue (e.g., in a hotspot mode). Therefore, the RF exposure can be managed as a time-averaged RF exposure evaluation (e.g., illustrated in FIG. 5), managed using a look-up table or flat or maximum value, or using another strategy or algorithm.

For certain aspects, a wireless device may communicate or be configured with a transmission duty cycle. The wireless device may determine transmit power level(s) and/or reserve power level(s) in compliance with the time-averaged RF exposure limit based on the duty cycle. The transmission duty cycle may be indicative of a share (e.g., 100 ms) of a specific period (e.g., 500 ms) in which the wireless device transmits RF signals. The duty cycle may be a ratio of the share to the specific period (e.g., 100 ms/500 ms), where the duty cycle may be represented as a number from zero to one. The duty cycle may be an effective duty cycle associated with a total transmit time of one or more transmissions in the time period, where the one or more transmissions may include bursts of transmissions having a gap of time positioned between at least two of the bursts. For example, in the first time window 502*a*, the duty cycle may be greater than 50% of the duration of the time window (T), whereas in the second time window 502*b*, the duty cycle may be equal to 100% of the duration of the time window (T). In certain cases, the duty cycle may be standardized (e.g., predetermined) with a specific RAT and/or vary over time, for example, due to changes in radio conditions, mobility, and/or user behavior.

As an example, certain RATs may specify the uplink duty cycle in the form of a time division duplexing (TDD) configuration, such as a TDD uplink-downlink (UL-DL) slot pattern in 5G NR or similar TDD patterns in E-UTRA or UMTS. In 5G NR, the TDD UL-DL slot pattern may specify the number of uplink slots and corresponding position in time associated with the uplink slots in a sequence of slots, such that the total number of uplink slots with respect to the total number of slots in the sequence is indicative of the duty cycle. In certain aspects, the duty cycle may correspond to the actual duration for past transmissions communicated, for example, within the TDD UL-DL slot pattern. For example, although the wireless device may be configured with a TDD UL-DL slot pattern, the wireless device may use a portion or subset of the UL slots for transmitting RF signals. Thus, the duty cycle used by the wireless device may be less than the maximum available duty cycle corresponding to the TDD UL-DL slot pattern.

Aspects Related to Dynamic Antenna Module Combining

Aspects of the present disclosure provide schemes for communicating via an AoD in compliance with certain RF exposure specifications, for example, as described herein with respect to FIG. 5. In certain aspects, dynamic antenna module combining may be used to enable communications via an AoD, as further described herein. The dynamic antenna module combining may be enable improved antenna gains for mmWave communications (e.g., improvements of about 3 to 4 decibels).

Figure 6A:
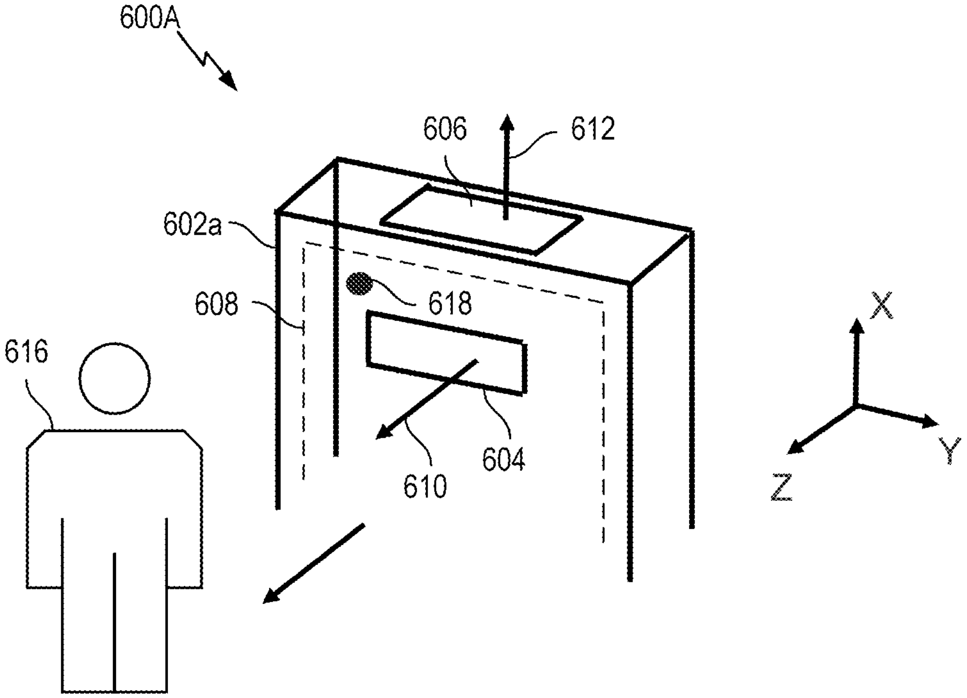
FIGS. 6A and 6B depict example antenna architectures of a wireless communications device for antenna module combining.
Figure 6B:
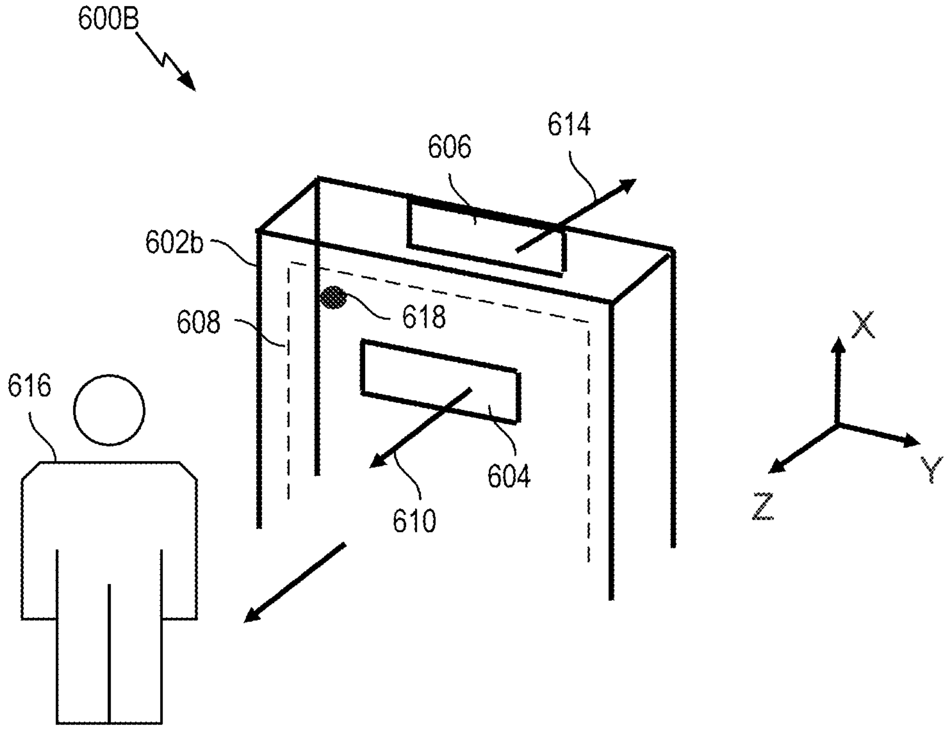

FIGS. 6A and 6B depict example antenna architectures 600A, 600B of a wireless communications device (hereinafter "the wireless device") for antenna module combining. In these examples, the wireless device 602*a*, 602*b* are depicted in an isometric view in three-dimensions (e.g., with respect to an x-axis, y-axis, and z-axis). The wireless device 602*a*, 602*b* may be an example of a user equipment, such as the UE 104 of FIG. 1. The wireless device 602*a*, 602*b* may include a first type of antenna module 604 and a second type of antenna module 606. In certain cases, the wireless device 602*a*, 602*b* may include a display 608, such as an OLED and/or LCD. The first type of antenna module 604 may be or include an antenna or an array of antenna elements integrated with, in, and/or on (e.g., arranged above or below) the display, such as an AoD. The first type of antenna module 604 may be or include an optically transparent antenna or antenna array formed on a substrate, such as a glass substrate of the display 608. In certain cases, the first type of antenna module 604 may be configured to perform certain sensing applications including, for example, hand gesture recognition, facial recognition, or the like. In certain cases, a boresight 610 of the radiation pattern for the first type of antenna module 604 may be arranged along the z-axis to emit RF radiation from the front face of the display 608. The first type of antenna module 604 may include an antenna array with, for example, a total of three or five antenna elements. In certain cases, the total number of antenna elements for the first type of antenna module 604 may be fewer than the total number of antenna elements for the second type of antenna module 606. The first type of antenna module 604 may be different from the second type of antenna module 606.

The second type of antenna module 606 may be or include an antenna or antenna array configured for wireless communications, such as mmWave communications, terahertz communications, and/or sub-terahertz communications. Referring to FIG. 6A, the second type of antenna module 606 may be arranged on the top edge of the wireless device 602*a*, such that the boresight 612 of the radiation pattern for the second type of antenna module 606 may be arranged along the x-axis to emit RF radiation from the top edge of the wireless device 602*a*. With respect to FIG. 6B, the second type of antenna module 606 may be arranged on the back face of wireless device 602*b*, such that the boresight 614 of the radiation pattern for the second type of antenna module 606 is arranged along the z-axis to emit RF radiation from the back face of the wireless device 602*b*.

In certain aspects, the wireless device 602*a*, 602*b* may communicate with antenna module combining via the first type of antenna module 604 and the second type of antenna module 606. The antenna module combining may be enabled for communications based on RF exposure conditions, RF exposure specifications, channel conditions, quality-of-service specifications, and/or the like. For example, the wireless device 602*a*, 602*b* may send signaling concurrently via the first type of antenna module 604 and the second type of antenna module 606. The first type of antenna module 604 may supplement the beamforming applied to the second type of antenna module 606 to output the signaling with combined beam steering. The first type of antenna module 604 may provide a supplemental phased array to effectively shape the beam of the radiation pattern emitted from the second type of antenna module 606. In certain cases, the antenna module combining with the first type of antenna module 604 and the second type of antenna module 606 may enable improved antenna gain (e.g., 3 to 4 decibels of antenna gain) relative to the antenna gain achieved with only the second type of antenna module 606.

In certain cases, the wireless device 602*a*, 602*b* may be positioned proximate to or far away from a human 616 in terms of RF exposure specifications. As an example, the wireless device 602*a*, 602*b* may be considered to be proximate to human tissue (e.g., head exposure, extremity exposure, and/or body-word exposure) in terms of an RF exposure specification when a separation distance between the wireless device and human tissue is less than or equal to certain threshold (e.g., 5-10 mm); and the wireless may be considered to be far away from or not proximate to human tissue (e.g., hotspot exposure) when the separation distance is greater than the threshold. The positioning of the human 616 relative to the wireless device 602*a*, 602*b* may involve certain RF exposure scenarios, such as head exposure, body or torso (body-worn) exposure, extremity exposure, and/or hotspot exposure. In certain cases, the positioning of the wireless device 602*a*, 602*b* relative to the human 616 may change over time. As an example, the wireless device 602*a*, 602*b* may be positioned proximate to the head or face of the human 616 involving head exposure (which may have a lower permissible RF exposure level) at a first time period. Then, the wireless device 602*a*, 602*b* may be positioned in a body-worn position, such as a pocket or bag, involving body exposure (which may have a higher permissible RF exposure level) at a second time period that occurs after the first time period (or vice versa).

The wireless device 602*a*, 602*b* may control the transmit power used for outputting signal(s) via the first type of antenna module 604 and/or the second type of antenna module 606 in compliance with an RF exposure limit depending on the RF exposure scenario(s) encountered by the wireless device 602*a*, 602*b*, for example, as described herein with respect to FIG. 5. For example, the wireless device 602*a*, 602*b* may determine a transmit power backoff (which may be used to determine a maximum allowed transmit power corresponding to the RF exposure limit or level) and/or an averaging time window for a specific RF exposure scenario. Accordingly, the maximum allowed transmit power available for the first type of antenna module 604 and/or the second type of antenna module 606 may be adjusted over time to be in compliance with the RF exposure limit associated with the current RF exposure scenario.

In certain aspects, the wireless device 602*a*, 602*b* may include sensing circuitry 618 used to identify an RF exposure scenario (such as head exposure, extremity (e.g., hand) exposure, body (body-worn) exposure, hotspot exposure, etc.) associated with the wireless device 602*a*, 602*b*. An RF exposure scenario associated with the wireless device 602*a*, 602*b* may include an RF exposure scenario encountered by or associated with the first type of antenna module 604 and/or the second type of antenna module 606. The sensing circuitry 618 may take, perform, or obtain measurements which are indicative of an RF exposure scenario, and the wireless device 602*a*, 602*b* may determine the RF exposure scenario based on the measurements. For example, the sensing circuitry 618 may include an on-off body sensor and/or a proximity sensor. The on-off body sensor may indicate or detect whether the wireless device 602*a*, 602*b* is positioned on or off (e.g., proximate to or far away from) the body (e.g., head, extremity, or body-worn) of the human 616. The on-off body sensor may be or include a capacitive touch sensor (e.g., a touch display or fingerprint reader), an optical sensor (e.g., a photoelectric sensor and/or camera), an inertial measurement unit (IMU), accelerometer, a gyroscope, a lidar sensor, and/or the like.

The proximity sensor may indicate or detect whether the wireless device 602*a*, 602*b* is proximate to human tissue with respect to a specified separation distance for RF exposure compliance. The proximity sensor may be or include a radar sensor, a sonic sensor (e.g., an ultrasonic sensor), an optical sensor (e.g., a photoelectric sensor), a camera, and/or the like. In some cases, the proximity sensor may be implemented in part via the first type of antenna module 604 and/or the second type of antenna module 606. As an example, the first type of antenna module 604 and/or the second type of antenna module 606 may be used as a radar sensor to detect the proximity of human tissue, for example, via a frequency-modulated continuous wave (FMCW) radar. In certain cases, a response associated with a transmission (e.g., impedance, power, efficiency, voltage standing wave ratio, etc.) via the first type of antenna module 604 and/or the second type of antenna module 606 may be indicative of whether human tissue is proximate to the wireless device 602*a*, 602*b*.

In certain aspects, the wireless device 602*a*, 602*b* may notify a network entity (e.g., the BS 102 of FIG. 1) of information related to antenna module combining and/or RF exposure. In certain cases, the wireless device 602*a*, 602*b* may notify the network entity of whether to enable or disable antenna module combining, for example, due to the RF exposure scenario encountered by or associated with the first type of antenna module 604 and/or the second type of antenna module 606. The wireless device 602*a*, 602*b* may identify whether human tissue is proximate to the first type of antenna module 604 (for example, using the sensing circuitry 618) in order to determine whether antenna module combining can be enabled or disabled for wireless communications. The wireless device 602*a*, 602*b* may detect or determine whether there is a display-side blockage positioned in front of the first type of antenna module 604, using the sensing circuitry 618, such as a front-side camera. The detection of the display-side blockage with respect to the first type of antenna module 604 may indicate the first type of antenna module 604 is expected to encounter performance losses and/or higher RF exposure levels to human tissue that may be causing the blockage.

As an example, when the wireless device 602*a*, 602*b* detects an RF exposure scenario with higher permissible RF exposure levels (e.g., body-worn exposure and/or hotspot exposure), the wireless device 602*a*, 602*b* may identify that antenna module combining can be enabled, and the wireless device 602*a*, 602*b* may notify a network entity to enable antenna module combining. When the wireless device 602*a*, 602*b* detects an RF exposure scenario with lower permissible RF exposure levels (e.g., head or extremity exposure), the wireless device 602*a*, 602*b* may identify that antenna module combining can be disabled to reduce RF exposure, and the wireless device 602*a*, 602*b* may notify a network entity to disable antenna module combining. In certain aspects, the network entity may enable or disable antenna module combining at the wireless device 602*a*, 602*b* without any requests from the wireless device 602*a*, 602*b*.

In certain aspects, the wireless device 602*a*, 602*b* may notify the network entity of whether a blockage loss associated with the first type of antenna module 604 and/or the second type of antenna module 606 is expected to impact antenna module combining. The wireless device 602*a*, 602*b* may send, to the network entity, an indication of a blockage loss related to antenna module combining. The indication of the blockage loss for the first type of antenna module 604 and/or the second type of antenna module 606 may indicate whether a blockage loss is above or below a threshold loss. When the blockage loss is above the threshold, the indication of the blockage loss may indicate that antenna module combining is expected to encounter performance losses, for example, due to a transmit power backoff being activated for RF exposure compliance. As such, antenna module combining may be disabled. When the blockage loss is below the threshold, the indication of the blockage loss may indicate that antenna module combining can be enabled. In certain aspects, the wireless device 602*a*, 602*b* may send, to the network entity, a request to enable or disable antenna module combining.

In certain aspects, the wireless device 602*a*, 602*b* may send, to the network entity, an indication of whether a transmit power backoff (which may be used to determine a maximum allowed transmit power corresponding to an RF exposure limit) is active for the first type of antenna module 604 and/or the second type of antenna module 606 to meet the RF exposure specification(s). The transmit power backoff may be indicative of the maximum allowed transmit power that can be used for the first type of antenna module 604 and/or the second type of antenna module 606 in compliance with the RF exposure limit (including a time-averaged RF exposure limit). A specific transmit power backoff may depend on the RF exposure scenario exhibited by or associated with the first type of antenna module 604 and/or the second type of antenna module 606. The indication of the blockage loss for the first type of antenna module 604 and/or the second type of antenna module 606 may be or include an indication of a specific transmit power backoff being active for the first type of antenna module 604 and/or the second type of antenna module 606.

In certain aspects, enablement and/or disablement of antenna module combining may be indicated via a beamforming configuration. The beamforming configuration may indicate or include one or more beams to use for communications via antenna module combining. In certain cases, the beamforming configuration may be provided to enable or disable antenna module combining at a UE. A transmission configuration indicator (TCI) state may indicate the transmit and/or receive beamforming to use for communications, and one or more TCI states may indicate the beamforming configuration to use for communications via antenna module combining.

Figure 7:
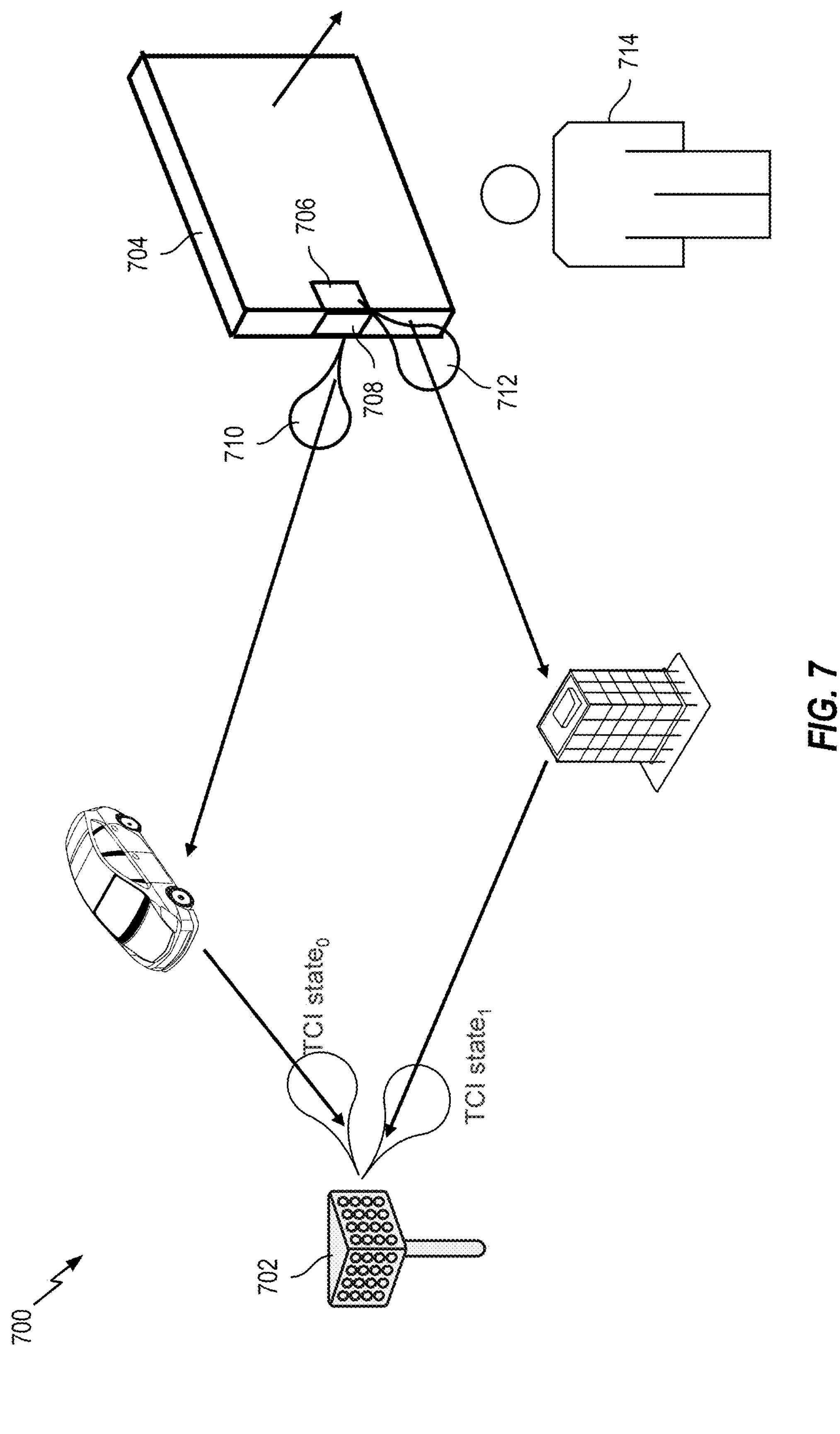
FIG. 7 depicts an example scheme for wireless communications via antenna module combining using a specific beamforming configuration.

FIG. 7 depicts an example scheme 700 for wireless communications via antenna module combining using a specific beamforming configuration. In this example, a UE 704 may be in communication with a network entity 702 via antenna module combining, for example, using a first type of antenna module 706 (e.g., the first type of antenna module 604) and a second type of antenna module 708 (e.g., the second type of antenna module 606). The UE 704 may be an example of the wireless device 602*a*, 602*b* of FIGS. 6A and 6B. The beamforming configuration used for the antenna module combining may correspond to one or more TCI states, for example, including a first TCI state (TCI $state_0$) and/or a second TCI state (TCI $state_1$). The first TCI state may correspond to the beamforming (e.g., transmit and/or receive beam(s) 710) used at the UE 704 to communicate via the second type of antenna module 708; and the second TCI state may correspond to the beamforming (e.g., transmit and/or receive beam(s) 712) used at the UE 704 to communication via the first type of antenna module 706. In certain cases, the first type of antenna module may be used to supplement the beamforming applied using the second type of antenna module. In certain cases, the UE 704 may send, to the network entity, an indication of the one or more TCI states to use for antenna module combining. In certain cases, the UE 704 may send, to the network entity, an indication of a first timing delay for the first TCI state and/or a second timing delay for the second TCI state. A timing delay may correspond to the propagation delay of a communication link between the UE and the network entity. The timing delay(s) may be used for coherent reception and/or transmission of signal(s) at the UE, such as coherent signal combining as a function of the TCI state(s) (e.g., beamforming).

As discussed herein, a human 714 may be positioned proximate to or far away from the UE 704 in terms of RF exposure compliance, and such positioning between the UE 704 and the human 714 may change over time. In certain cases, the UE 704 may adjust the transmit power(s) used for communications using antenna module combining based on the RF exposure scenario encountered by or associated with the first type of antenna module 706 and/or the second type of antenna module 708. In certain cases, the UE 704 may request to enable or disable antenna module combining in response to detection of an RF exposure scenario that is expected to affect antenna module combining. In certain cases, the UE 704 may send, to the network entity, information related to antenna module combining and/or RF exposure as described herein.

Example Signaling for Dynamic Antenna Module Combining

Figure 8:
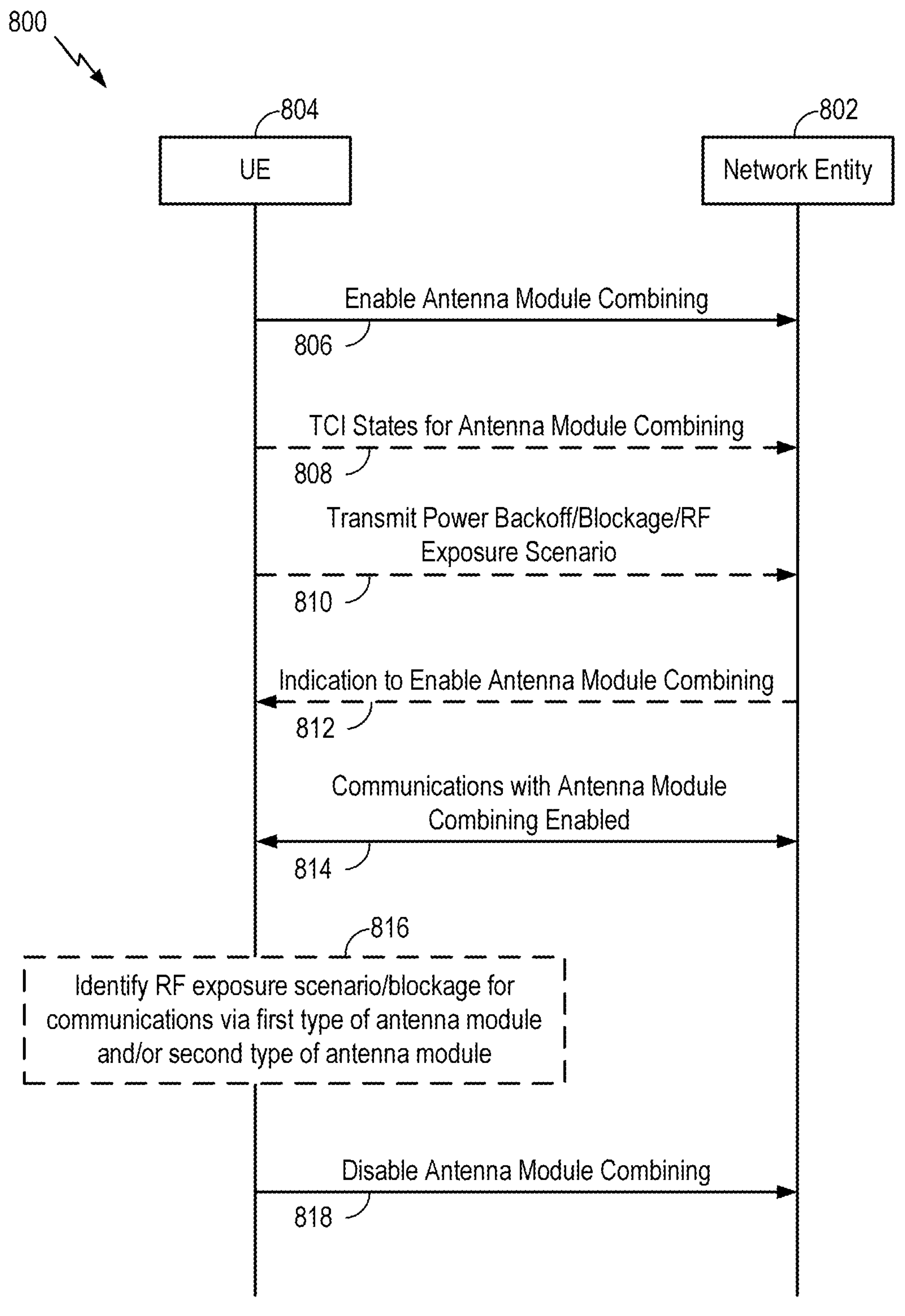
FIG. 8 depicts a process flow for signaling for dynamic antenna module combining.

FIG. 8 depicts a process flow 800 for signaling for dynamic antenna module combining in a system between a network entity 802 and a user equipment (UE) 804. In some aspects, the network entity 802 may be an example of the BS 102 depicted and described with respect to FIGS. 1 and 3 or a disaggregated base station depicted and described with respect to FIG. 2. Similarly, the UE 804 may be an example of UE 104 depicted and described with respect to FIGS. 1 and 3 and/or the wireless device 602*a*, 602*b* of FIGS. 6A and 6B. However, in other aspects, UE 804 may be another type of wireless communications device and network entity 802 may be another type of network entity or network node, such as those described herein. Note that any operations or signaling illustrated with dashed lines may indicate that that operation or signaling is an optional or alternative example.

At 806, the UE 804 sends, to the network entity 802, a request to enable antenna module combining for communications between the UE 804 and the network entity 802. In this example, the UE 804 may include a first type of antenna module and a second type of antenna module, such as described herein with respect to FIGS. 6A and 6B. Such a request may allow the network entity to knowing when antenna module combining can be enabled in compliance with an RF exposure limit.

At 808, the UE 804 optionally sends, to the network entity 802, an indication of the TCI state(s) that may be used for the antenna module combining, for example, as described herein with respect to FIG. 7. In certain cases, the UE 804 may send the timing delay(s) associated with the TCI state(s) to be used for the antenna module combining. In certain cases, any such information may be communicated with the request at 806 and/or via separate signaling.

At 810, the UE 804 optionally sends, to the network entity 802, certain information associated with the antenna module combining. The information may include, for example, the transmit power backoff that is expected or active for the first type of antenna module and/or the second type of antenna module. The information may include an indication of whether there is a blockage positioned proximate to (e.g., less than or equal to 5-10 mm) the first type of antenna module and/or the second type of antenna module. The information may include an indication of a blockage loss associated with the first type of antenna module and/or the second type of antenna module. The information may include an indication of an RF exposure scenario that is being encountered or expected to be encountered for the first type of antenna module and/or the second type of antenna module. In certain cases, any such information may be communicated with the request at 806 and/or via separate signaling.

At 812, the UE 804 optionally obtains, from the network entity 802, an indication to enable antenna module combining at the UE 804. In certain cases, the indication may indicate one or more TCI states to be used for the antenna module combining, for example, as described herein with respect to FIG. 7. The indication may indicate the timing delay(s) associated with the TCI state(s). In certain cases, the indication may be or include scheduling for communications between the UE 804 and the network entity 802. The scheduling may indicate time-frequency resource(s) for communications between the UE 804 and the network entity 802. The scheduling may indicate periodic and/or semi-persistent communication resources. The scheduling may be dynamic scheduling, such as downlink control information. The indication and/or scheduling may be communicated via radio resource control (RRC) signaling, medium access control (MAC) signaling, downlink control information (DCI), and/or the like.

At 814, the UE 804 communicates with the network entity 802 with antenna module combining enabled. As an example, the UE 804 may transmit signal(s) via the first type of antenna module and the second type of antenna module, simultaneously, at transmit power(s) in compliance with an RF exposure limit (such as a time-averaged RF exposure limit as described herein with respect to FIG. 5). In certain cases, the UE 804 may use the first type of antenna module to supplement the beamforming applied via the second type of antenna module.

At 816, the UE 804 optionally identifies an RF exposure scenario and/or a blockage for communications via the first type of antenna module and/or the second type of antenna module. For example, the UE 804 may be moved to be proximate to human tissue, for example, held in a user's hand or placed in a pocket or bag. The RF exposure scenario may trigger the UE 804 to activate or adjust a transmit power backoff for communications with the antenna module combining enabled.

At 818, the UE 804 sends, to the network entity 802, a request to disable antenna module combining. The UE 804 may send the request in response to the identification of the RF exposure scenario and/or blockage. In certain cases, the request may be or include an indication of the transmit power backoff that is expected for the antenna module combining. The request may be or include an indication of a blockage or blockage loss that is expected for the antenna module combining. Accordingly, the dynamic antenna module combining may enable effective RF exposure compliance for communications that involve an AoD. The antenna module combining may enable improved antenna gains for mmWave communications (e.g., improvements of about 3 to 4 decibels).

Note that the process flow illustrated in FIG. 8 is described herein to facilitate an understanding of dynamic antenna module combining, and aspects of the present disclosure may be performed in various manners via alternative or additional signaling and/or operations. In certain aspects, the operations and/or signaling of FIG. 8 may occur in an order different from that described or depicted, and various actions, operations, and/or signaling may be added, omitted, or combined.

Example Operations of Dynamic Antenna Module Combining

Figure 9:
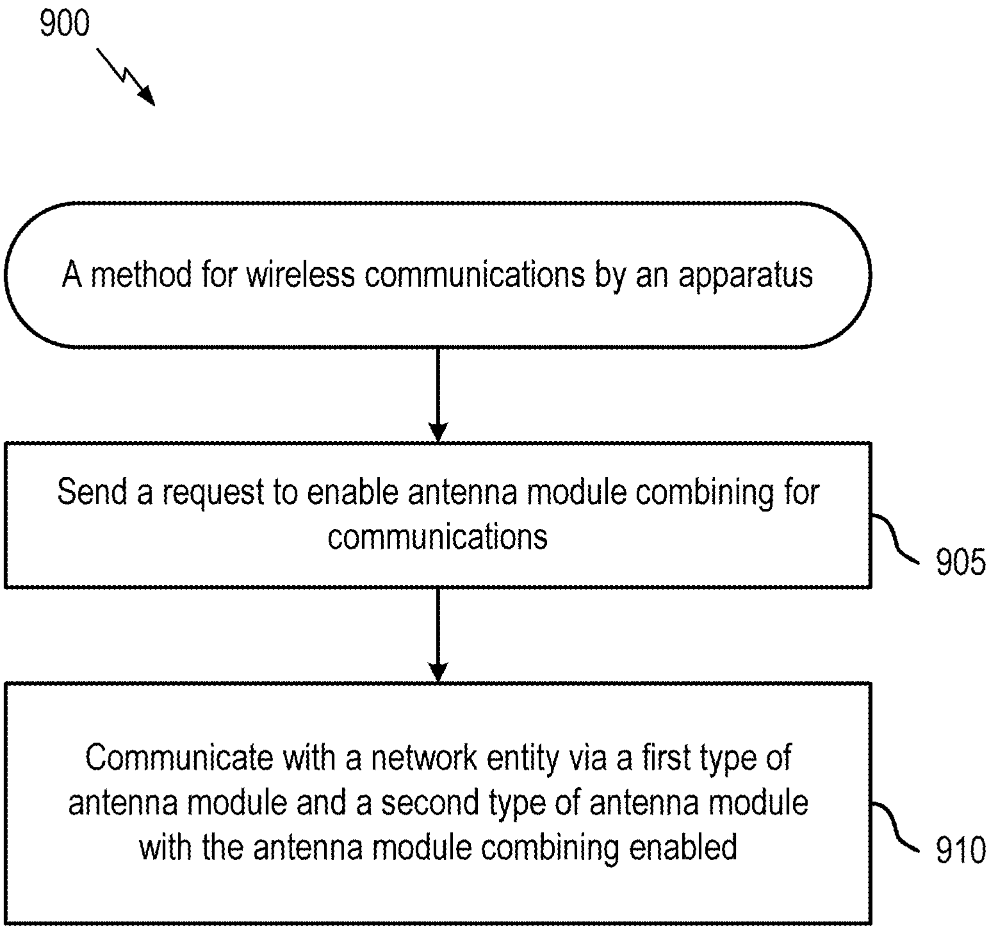
FIG. 9 depicts a method for wireless communications.

FIG. 9 shows a method 900 for wireless communications by an apparatus, such as UE 104 of FIGS. 1 and 3.

Method 900 begins at block 905 with sending a request to enable antenna module combining for communications, for example, as described herein with respect to FIG. 8.

Method 900 then proceeds to block 910 with communicating with a network entity via a first type of antenna module and a second type of antenna module with the antenna module combining enabled, for example, as described herein with respect to FIGS. 6A-8. In certain aspects, block 910 includes sending signaling concurrently via the first type of antenna module and the second type of antenna module. The communications with antenna module combining may enable improved antenna gains for mmWave communications (e.g., improvements of about 3 to 4 decibels) and/or terahertz or sub-terahertz communications. In certain cases, the dynamic antenna module combining may enable communications via an AoD in compliance with certain RF exposure specification(s).

In certain aspects, the first type of antenna module comprises an antenna module integrated with a display (e.g., an AoD), and the second type of antenna module is different from the first type of antenna module. For example, the first type of antenna module may be configured to perform certain sensor applications, such as hand gesture recognition; and the second type of antenna module may be configured for wireless communications. In certain aspects, the first type of antenna module is optically transparent to a human eye. In certain aspects, the first type of antenna module is integrated with a display, and wherein the second type of antenna module is arranged on a top edge or a back of the apparatus and adjacent to the display, for example, as described herein with respect to FIGS. 6A and 6B. Other suitable arrangements for the second type of antenna module may be used.

In certain aspects, method 900 further includes sending an indication of a plurality of TCI states to be used for the antenna module combining. In certain aspects, the plurality of TCI states comprises a first TCI state associated with the first type of antenna module and a second TCI state associated with the second type of antenna module. In certain aspects, method 900 further includes sending an indication of a first timing delay for the first TCI state and a second timing delay for the second TCI state.

In certain aspects, method 900 further includes sending an indication that a transmit power backoff associated with a radio frequency exposure specification (e.g., a maximum permissible exposure (MPE) level or limit or an RF exposure limit) is active for communications via at least the first type of antenna module. In certain aspects, block 910 includes sending signaling at a first transmit power via the first type of antenna module based on the transmit power backoff. In certain aspects, method 900 further includes identifying a radio frequency exposure scenario that triggers the transmit power backoff for the communications via the first type of antenna module. In certain aspects, the radio frequency exposure scenario comprises one or more of: a head exposure scenario, a body-worn exposure scenario, an extremity exposure scenario, a human tissue exposure scenario, or a hotspot exposure scenario.

In certain aspects, method 900 further includes sending a request to disable the antenna module combining.

In certain aspects, method 900 further includes identifying a radio frequency exposure scenario, associated with the first type of antenna module, that triggers disabling or disablement of antenna module combining.

In certain aspects, method 900 further includes sending an indication that a loss associated with a blockage arranged proximate to the first type of antenna module is above a threshold. In certain aspects, method 900 further includes sending an indication that a loss associated with a blockage arranged proximate to the first type of antenna module is below a threshold.

In certain aspects, method 900 further includes sending an indication that a blockage is observed (e.g., detected) or arranged proximate to the first type of antenna module, such that a radio frequency exposure scenario is active for the first type of antenna module to disable the antenna module combining.

In certain aspects, method 900 further includes identifying a radio frequency exposure scenario associated with the first type of antenna module; and communicating with the antenna module combining comprises sending signaling via the first type of antenna module at a transmit power in compliance with a radio frequency exposure specification based at least in part on the radio frequency exposure scenario.

In certain aspects, the radio frequency exposure scenario comprises radio frequency exposure to human tissue via the first type of antenna module.

Figure 11:
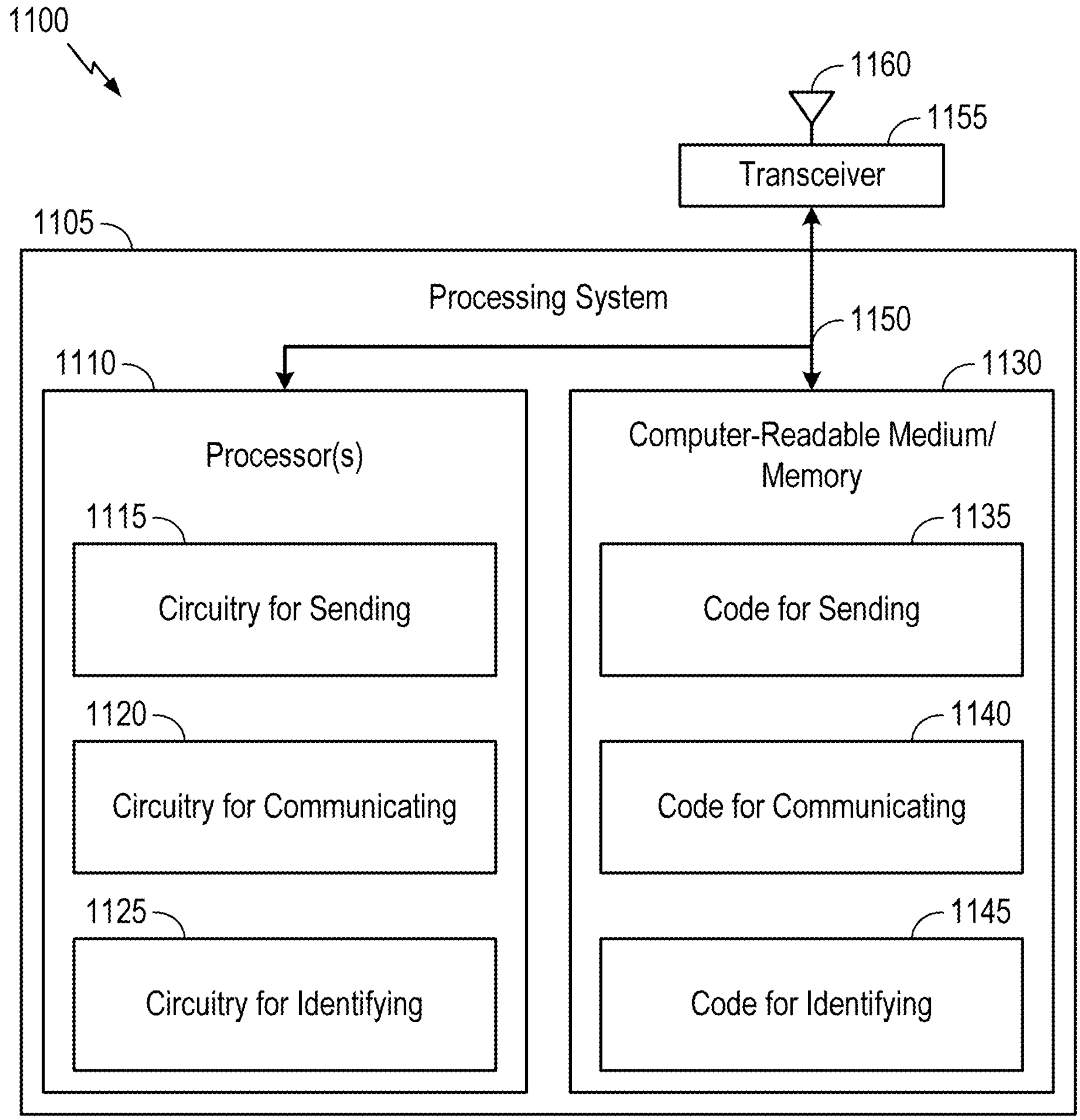
FIG. 11 depicts aspects of an example communications device.

In certain aspects, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative operations are possible consistent with this disclosure.

Figure 10:
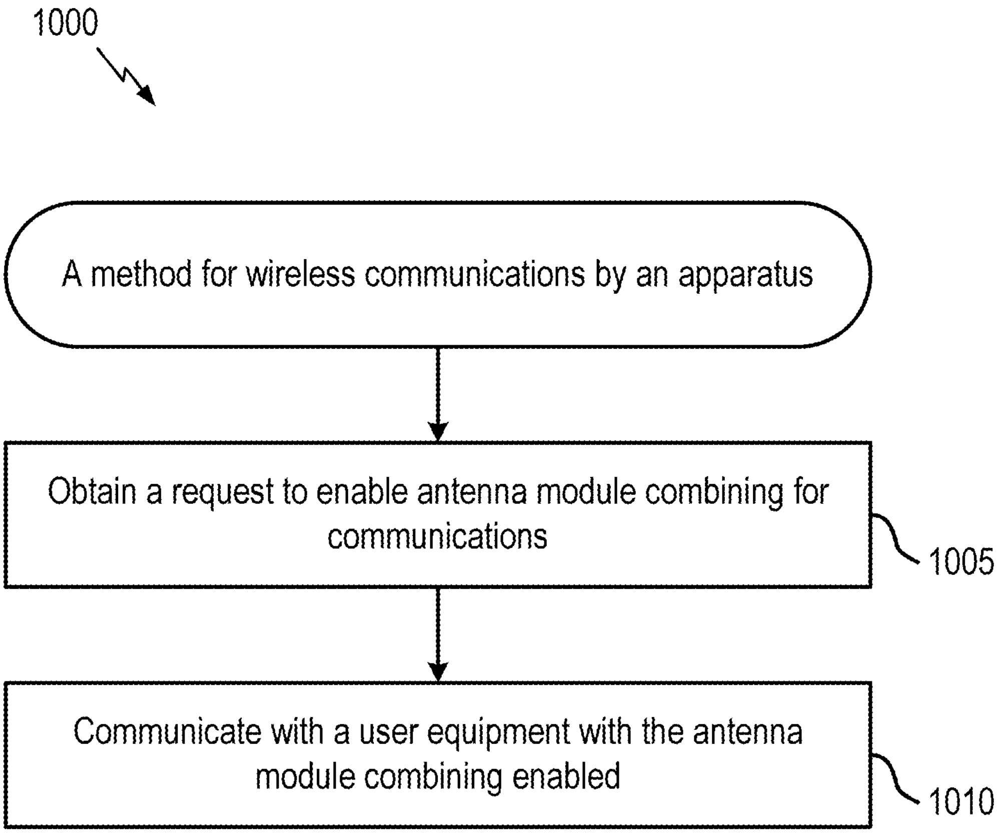
FIG. 10 depicts another method for wireless communications.

FIG. 10 shows a method 1000 for wireless communications by an apparatus, such as BS 102 of FIGS. 1 and 3, or a disaggregated base station as discussed with respect to FIG. 2.

Method 1000 begins at block 1005 with obtaining a request to enable antenna module combining for communications, for example, as described herein with respect to FIG. 8.

Method 1000 then proceeds to block 1010 with communicating with a user equipment with the antenna module combining enabled, for example, as described herein with respect to FIGS. 6A-8. The communications with antenna module combining may enable improved antenna gains for mmWave communications (e.g., improvements of about 3 to 4 decibels) and/or terahertz or sub-terahertz communications. In certain cases, the dynamic antenna module combining may enable communications via an AoD in compliance with certain RF exposure specification(s).

In certain aspects, method 1000 further includes obtaining an indication of a plurality of TCI states to be used for the antenna module combining. In certain aspects, the plurality of TCI states comprises a first TCI state associated with the first type of antenna module and a second TCI state associated with the second type of antenna module. In certain aspects, method 1000 further includes obtaining an indication of a first timing delay for the first TCI state and a second timing delay for the second TCI state.

In certain aspects, method 1000 further includes obtaining an indication that a transmit power backoff associated with a radio frequency exposure specification is active for communications via at least the first type of antenna module.

In certain aspects, method 1000 further includes obtaining a request to disable the antenna module combining.

In certain aspects, method 1000 further includes obtaining an indication that a loss associated with a blockage arranged proximate to the first type of antenna module is above a threshold. In certain aspects, method 1000 further includes obtaining an indication that a loss associated with a blockage observed (e.g., detected) or arranged proximate to the first type of antenna module is below a threshold.

In certain aspects, method 1000 further includes obtaining an indication that a blockage is arranged proximate to the first type of antenna module, such that a radio frequency exposure scenario is active for the first type of antenna module to disable the antenna module combining.

Figure 12:
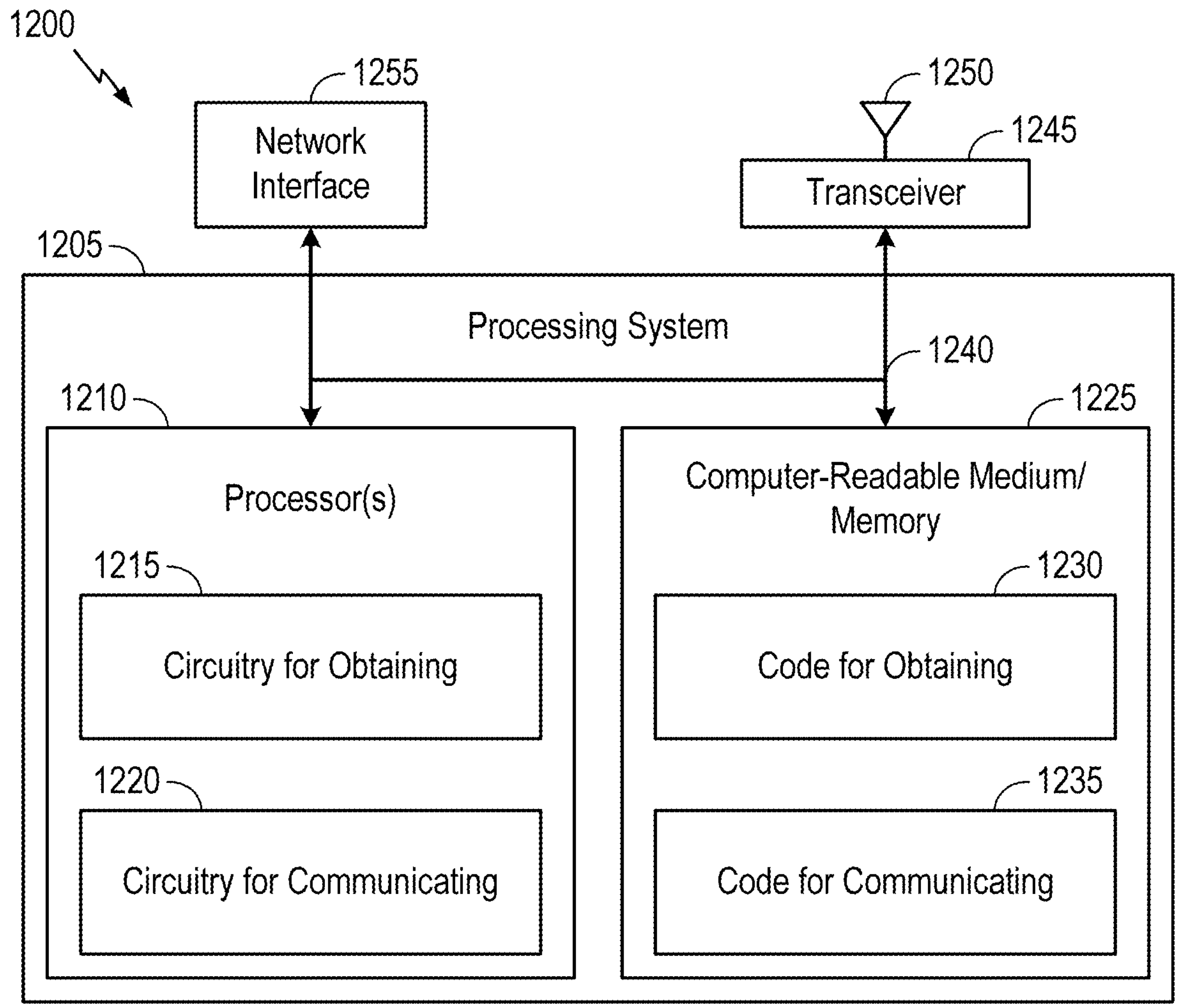
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to a transceiver 1155 (e.g., a transmitter and/or a receiver). The transceiver 1155 is configured to transmit and receive signals for the communications device 1100 via an antenna 1160, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code), including code 1135-1145, that when executed by the one or more processors 1110, enable and cause the one or more processors 1110 to perform the method 900 described with respect to FIG. 9, or any aspect related to it, including any operations described in relation to FIG. 9. Note that reference to a processor performing a function of communications device 1100 may include one or more processors performing that function of communications device 1100, such as in a distributed fashion.

In the depicted example, computer-readable medium/memory 1130 stores code for sending 1135, code for communicating 1140, and code for identifying 1145. Processing of the code 1135-1145 may enable and cause the communications device 1100 to perform the method 900 described with respect to FIG. 9, or any aspect related to it.

The one or more processors 1110 include circuitry configured to implement (e.g., execute) the code (e.g., executable instructions) stored in the computer-readable medium/memory 1130, including circuitry for sending 1115, circuitry for communicating 1120, and circuitry for identifying 1125. Processing with circuitry 1115-1125 may enable and cause the communications device 1100 to perform the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1155 and/or antenna 1160 of the communications device 1100 in FIG. 11, and/or one or more processors 1110 of the communications device 1100 in FIG. 11. Means for communicating, receiving or obtaining may include the transceivers 354, antenna(s) 352, receive processor 358, AI processor 370, and/or controller/processor 380 of the UE 104 illustrated in FIG. 3, transceiver 1155 and/or antenna 1160 of the communications device 1100 in FIG. 11, and/or one or more processors 1110 of the communications device 1100 in FIG. 11. Means for identifying of the method 900 described with respect to FIG. 9, or any aspect related to it, may include the AI processor 370, and/or controller/processor 380 of the UE 104 illustrated in FIG. 3, and/or one or more processors 1110 of the communications device 1100 in FIG. 11

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to a transceiver 1245 (e.g., a transmitter and/or a receiver) and/or a network interface 1255. The transceiver 1245 is configured to transmit and receive signals for the communications device 1200 via an antenna 1250, such as the various signals as described herein. The network interface 1255 is configured to obtain and send signals for the communications device 1200 via communications link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1225 via a bus 1240. In certain aspects, the computer-readable medium/memory 1225 is configured to store instructions (e.g., computer-executable code), including code 1230 and 1235, that when executed by the one or more processors 1210, enable and cause the one or more processors 1210 to perform the method 1000 described with respect to FIG. 10, or any aspect related to it, including any operations described in relation to FIG. 10. Note that reference to a processor of communications device 1200 performing a function may include one or more processors of communications device 1200 performing that function, such as in a distributed fashion.

In the depicted example, the computer-readable medium/memory 1225 stores code for obtaining 1230 and code for communicating 1235. Processing of the code 1230 and 1235 may enable and cause the communications device 1200 to perform the method 1000 described with respect to FIG. 10, or any aspect related to it.

The one or more processors 1210 include circuitry configured to implement (e.g., execute) the code (e.g., executable instructions) stored in the computer-readable medium/memory 1225, including circuitry for obtaining 1215 and circuitry for communicating 1220. Processing with circuitry 1215 and 1220 may enable and cause the communications device 1200 to perform the method 1000 described with respect to FIG. 10, or any aspect related to it.

Various components of the communications device 1200 may provide means for performing the method 1000 described with respect to FIG. 10, or any aspect related to it. Means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1245, antenna 1250, and/or network interface 1255 of the communications device 1200 in FIG. 12, and/or one or more processors 1210 of the communications device 1200 in FIG. 12. Means for communicating, receiving or obtaining may include the transceivers 332, antenna(s) 334, receive processor 338, AI processor 318, and/or controller/processor 340 of the BS 102 illustrated in FIG. 3, transceiver 1245, antenna 1250, and/or network interface 1255 of the communications device 1200 in FIG. 12, and/or one or more processors 1210 of the communications device 1200 in FIG. 12.

Example Clauses

Implementation examples are described in the following numbered clauses:

Clause 1: A method for wireless communications by an apparatus comprising: sending a request to enable antenna module combining for communications; and communicating with a network entity via a first type of antenna module and a second type of antenna module with the antenna module combining enabled.

Clause 2: The method of Clause 1, wherein communicating with the network entity comprises sending signaling concurrently via the first type of antenna module and the second type of antenna module.

Clause 3: The method of any one of Clauses 1-2, wherein: the first type of antenna module comprises an antenna module integrated with a display, and the second type of antenna module is different from the first type of antenna module.

Clause 4: The method of any one of Clauses 1-3, further comprising sending an indication of a plurality of TCI states to be used for the antenna module combining.

Clause 5: The method of Clause 4, wherein the plurality of TCI states comprises a first TCI state associated with the first type of antenna module and a second TCI state associated with the second type of antenna module.

Clause 6: The method of Clause 5, further comprising sending an indication of a first timing delay for the first TCI state and a second timing delay for the second TCI state.

Clause 7: The method of any one of Clauses 1-6, further comprising sending an indication that a transmit power backoff associated with a radio frequency exposure specification is active for communications via at least the first type of antenna module.

Clause 8: The method of Clause 7, wherein communicating with the network entity comprises sending signaling at a first transmit power via the first type of antenna module based on the transmit power backoff.

Clause 9: The method of Clause 7 or 8, further comprising identifying a radio frequency exposure scenario that triggers the transmit power backoff for the communications via the first type of antenna module.

Clause 10: The method of Clause 9, wherein the radio frequency exposure scenario comprises one or more of: a head exposure scenario, a body-worn exposure scenario, an extremity exposure scenario, a human tissue exposure scenario, or a hotspot exposure scenario.

Clause 11: The method of any one of Clauses 1-10, further comprising sending a request to disable the antenna module combining.

Clause 12: The method of Clause 11, further comprising identifying a radio frequency exposure scenario, associated with the first type of antenna module, that triggers disabling antenna module combining.

Clause 13: The method of any one of Clauses 1-12, further comprising sending an indication that a loss associated with a blockage arranged proximate to the first type of antenna module is above a threshold.

Clause 14: The method of any one of Clauses 1-13, further comprising sending an indication that a loss associated with a blockage arranged proximate to the first type of antenna module is below a threshold.

Clause 15: The method of any one of Clauses 1-14, further comprising sending an indication that a blockage is arranged proximate to the first type of antenna module, such that a radio frequency exposure scenario is active for the first type of antenna module to disable the antenna module combining.

Clause 16: The method of any one of Clauses 1-15, further comprising identifying a radio frequency exposure scenario associated with the first type of antenna module; and communicating with the antenna module combining comprises sending signaling via the first type of antenna module at a transmit power in compliance with a radio frequency exposure specification based at least in part on the radio frequency exposure scenario.

Clause 17: The method of Clause 16, wherein the radio frequency exposure scenario comprises radio frequency exposure to human tissue via the first type of antenna module.

Clause 18: The method of any one of Clauses 1-17, wherein the first type of antenna module is integrated with a display, and wherein the second type of antenna module is arranged on a top edge or a back of the apparatus and adjacent to the display.

Clause 19: The method of any one of Clauses 1-18, wherein the first type of antenna module is optically transparent.

Clause 20: A method for wireless communications by an apparatus comprising: obtaining a request to enable antenna module combining for communications; and communicating with a user equipment with the antenna module combining enabled.

Clause 21: The method of Clause 20, further comprising obtaining an indication of a plurality of TCI states to be used for the antenna module combining.

Clause 22: The method of Clause 21, wherein the plurality of TCI states comprises a first TCI state associated with the first type of antenna module and a second TCI state associated with the second type of antenna module.

Clause 23: The method of Clause 22, further comprising obtaining an indication of a first timing delay for the first TCI state and a second timing delay for the second TCI state.

Clause 24: The method of any one of Clauses 20-23, further comprising obtaining an indication that a transmit power backoff associated with a radio frequency exposure specification is active for communications via at least the first type of antenna module.

Clause 25: The method of any one of Clauses 20-24, further comprising obtaining a request to disable the antenna module combining.

Clause 26: The method of any one of Clauses 20-25, further comprising obtaining an indication that a loss associated with a blockage arranged proximate to the first type of antenna module is above a threshold.

Clause 27: The method of any one of Clauses 20-26, further comprising obtaining an indication that a loss associated with a blockage arranged proximate to the first type of antenna module is below a threshold.

Clause 28: The method of any one of Clauses 20-27, further comprising obtaining an indication that a blockage is arranged proximate to the first type of antenna module, such that a radio frequency exposure scenario is active for the first type of antenna module to disable the antenna module combining.

Clause 29: One or more apparatuses, comprising: one or more memories comprising executable instructions; and one or more processors configured to execute the executable instructions and cause the one or more apparatuses to perform a method in accordance with any one of Clauses 1-28.

Clause 30: One or more apparatuses, comprising: one or more memories; and one or more processors, coupled to the one or more memories, configured to cause the one or more apparatuses to perform a method in accordance with any one of Clauses 1-28.

Clause 31: One or more apparatuses, comprising: one or more memories; and one or more processors, coupled to the one or more memories, configured to perform a method in accordance with any one of Clauses 1-28.

Clause 32: One or more apparatuses, comprising means for performing a method in accordance with any one of Clauses 1-28.

Clause 33: One or more non-transitory computer-readable media comprising executable instructions that, when executed by one or more processors of one or more apparatuses, cause the one or more apparatuses to perform a method in accordance with any one of Clauses 1-28.

Clause 34: One or more computer program products embodied on one or more computer-readable storage media comprising code for performing a method in accordance with any one of Clauses 1-28.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
- one or more memories; and
- one or more processors coupled to the one or more memories, the one or more processors being configured to cause the apparatus to:
  - send, to a network entity, a request to enable antenna module combining for communications;
  - send, to the network entity, an indication of a plurality of transmission configuration indicator (TCI) states to be used for the antenna module combining; and
  - communicate with the network entity via a first type of antenna module and a second type of antenna module with the antenna module combining enabled.

2. The apparatus of claim 1, wherein to communicate with the network entity, the one or more processors are configured to cause the apparatus to send signaling concurrently via the first type of antenna module and the second type of antenna module.

3. The apparatus of claim 1, wherein:
- the first type of antenna module comprises an antenna module integrated with a display, and
- the second type of antenna module is different from the first type of antenna module.

4. The apparatus of claim 1, wherein the plurality of TCI states comprises a first TCI state associated with the first type of antenna module and a second TCI state associated with the second type of antenna module.

5. The apparatus of claim 4, wherein the one or more processors are configured to cause the apparatus to send an indication of a first timing delay for the first TCI state and a second timing delay for the second TCI state.

6. The apparatus of claim 1, wherein the one or more processors are configured to cause the apparatus to send, to the network entity, an indication that a transmit power backoff associated with a radio frequency exposure specification is active for communications via at least the first type of antenna module.

7. The apparatus of claim 6, wherein to communicate with the network entity, the one or more processors are configured to cause the apparatus to send signaling at a first transmit power via the first type of antenna module based on the transmit power backoff.

8. The apparatus of claim 6, wherein the one or more processors are configured to cause the apparatus to identify a radio frequency exposure scenario that triggers the transmit power backoff for the communications via the first type of antenna module.

9. The apparatus of claim 8, wherein the radio frequency exposure scenario comprises one or more of:
- a head exposure scenario,
- a body-worn exposure scenario,
- an extremity exposure scenario,
- a human tissue exposure scenario, or
- a hotspot exposure scenario.

10. The apparatus of claim 1, wherein the one or more processors are configured to cause the apparatus to send, to the network entity, a request to disable the antenna module combining.

11. The apparatus of claim 10, wherein the one or more processors are configured to cause the apparatus to identify a radio frequency exposure scenario, associated with the first type of antenna module, that triggers disabling antenna module combining.

12. The apparatus of claim 1, wherein the one or more processors are configured to cause the apparatus to send, to the network entity, an indication that a loss associated with a blockage arranged proximate to the first type of antenna module is above a threshold.

13. The apparatus of claim 1, wherein the one or more processors are configured to cause the apparatus to send, to the network entity, an indication that a loss associated with a blockage arranged proximate to the first type of antenna module is below a threshold.

14. The apparatus of claim 1, wherein the one or more processors are configured to cause the apparatus to send, to the network entity, an indication that a blockage is arranged proximate to the first type of antenna module, such that a radio frequency exposure scenario is active for the first type of antenna module to disable the antenna module combining.

15. The apparatus of claim 1, wherein:
- the one or more processors are configured to cause the apparatus to identify a radio frequency exposure scenario associated with the first type of antenna module; and
- to communicate with the antenna module combining, the one or more processors are configured to cause the apparatus to send signaling via the first type of antenna module at a transmit power in compliance with a radio frequency exposure specification based at least in part on the radio frequency exposure scenario.

16. The apparatus of claim 15, wherein the radio frequency exposure scenario comprises radio frequency exposure to human tissue via the first type of antenna module.

17. The apparatus of claim 1, further comprising a display, wherein the first type of antenna module is integrated with the display, and wherein the second type of antenna module is arranged on a top edge or a back of the apparatus and adjacent to the display.

18. The apparatus of claim 1, wherein the first type of antenna module is optically transparent.

19. A method for wireless communications, comprising:

sending, to a network entity, a request to enable antenna module combining for communications;

sending, to the network entity, an indication of a plurality of transmission configuration indicator (TCI) states to be used for the antenna module combining; and communicating with the network entity via a first type of antenna module and a second type of antenna module with the antenna module combining enabled.

* * * * *